Aug. 14, 1951 T. W. MILLNS 2,564,271
POWER TRANSMISSION MECHANISM
Filed Aug. 2, 1949 2 Sheets-Sheet 1

Inventor
T. W. Millns

Patented Aug. 14, 1951

2,564,271

UNITED STATES PATENT OFFICE 2,564,271

POWER TRANSMISSION MECHANISM

Terence William Millns, Shepherds Bush, London, England, assignor to Rotax Limited, Willesden Junction, London, England Application August 2, 1949, Serial No. 108,095
In Great Britain August 9, 1948

2 Claims. (Cl. 74—785)

This invention relates to power transmission mechanisms of the kind comprising an electric motor, and epicyclic reduction gear. In particular the invention relates to mechanisms of the kind and ordinarily known as actuators, these being adapted to operate, through a nut and screw, the under carriage of an aeroplane, or a wing section, or to serve any other analogous purpose. In such mechanisms the reduction gear usually includes a rotatable part, such as an annulus, which is normally stationary, but which can be released to enable the under carriage or other part to move freely under gravity. It has been found, however, that when the said part is allowed to move freely it may acquire sufficient momentum to injure the stops provided for determining the limit of the free movement, and the need has in consequence arisen for controlling this movement. The object of the present invention is to provide the desired control in a simple and convenient manner.

In one known form of actuator of the kind above specified, the releasable member consists of a rotatable annulus forming part of the reduction gear. This annulus has a notched periphery, and it is normally held stationary by a pawl engaging one of the notches. To release the annulus the pawl is retracted. When released the under carriage or other part can drop under gravity independently of the electric motor which normally actuates the gear.

Figure 1:
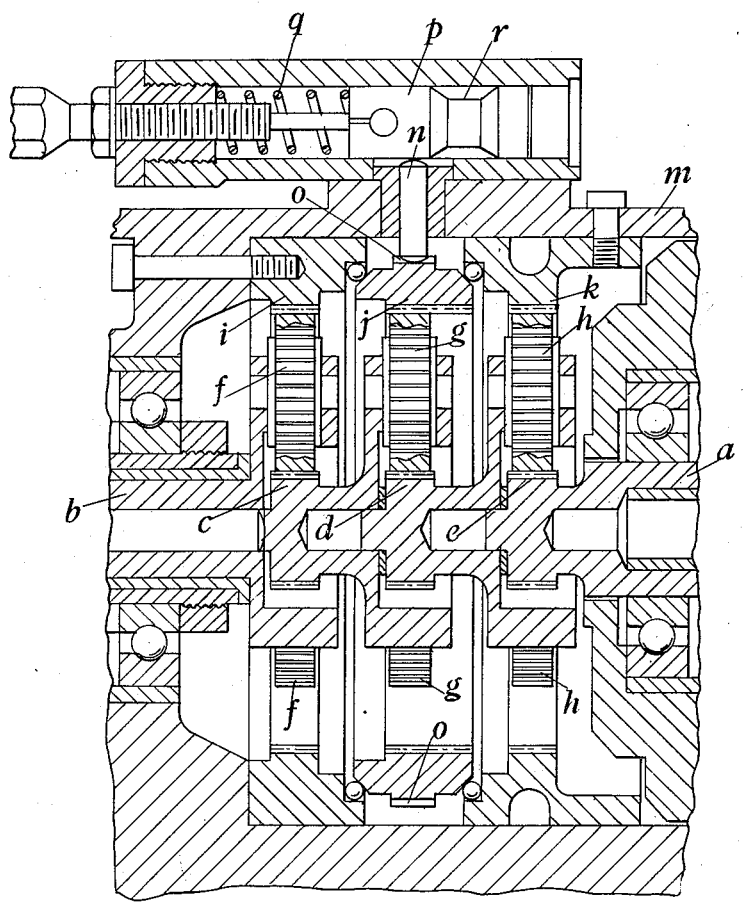
Figure 2:
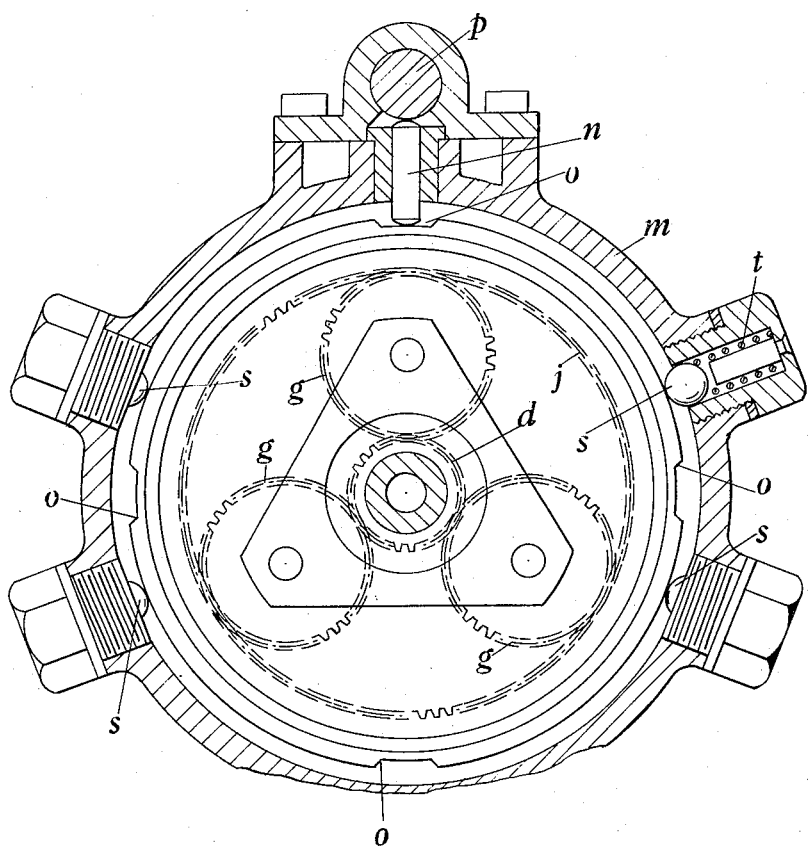

In the accompanying drawings,

Figures 1 and 2 are respectively sectional side and end views of a portion of an actuator embodying one form of the invention.

Referring to the drawings, $a$ is a shaft driven by an electric motor, and $b$ is a shaft by which motion is transmitted to a screw mechanism for actuating the under carriage, wing section or other part of an aeroplane, or for any other analogous purpose to which actuators are applicable. The shafts $a$ and $b$ are interconnected by an epicyclic mechanism comprising sun pinions $c, d, e,$ planet pinions $f, g, h$ and axially immovable annuli $i, j, k$. The two annuli $i, k$ are fixed in the housing $m$, but the annulus $j$ is freely mounted. To secure the annulus $j$ against rotation, a pawl $n$ is provided. The pawl $n$ can engage any one of a plurality of notches $o$ in the annulus $j$ and is controlled by a slidable plunger $p$ loaded by a spring $q$ and provided with a circumferential groove $r$. The plunger is slidable by any convenient means, and when it is so moved as to bring the groove $r$ opposite the pawl the latter is free to move outwardly for releasing the annulus.

In one manner of applying the present invention to such a mechanism, there is arranged in the housing, and in association with the annulus $j$, at least one ball $s$ loaded by a spring $t$. In the example illustrated four such spring-loaded balls are used. These bear on the periphery of the annulus $j$ and can successively engage the notches $o$ when the annulus is released by the pawl $n$.

On release of the annulus $j$ it can be rotated by the falling of the under carriage actuated through the shaft $b$, and the resistance to motion exerted by the spring loaded balls is made sufficient to effect the desired control of the rate of movement of the under carriage.

The invention is not, however, restricted to an actuator for operating an under carriage as it is equally applicable to actuators for operating wing parts, or other components of an aeroplane, or for other analogous purposes.

Having thus described my invention what I claim as new and desire to secure by Letters Patent is:

1. In a power transmission mechanism having a driving member, a driven member, an epicyclic reduction gear connected to the driving and driven members and provided with a rotatable annulus which can be held against rotation for enabling motion to be transmitted from said driving member to said driven member through said gear, and retaining means for releasably engaging said annulus to prevent rotation thereof, at least one spring-loaded ball acting on the outer periphery of said annulus to retard rotary motion thereof upon said retaining means being put out of action.

2. In a power transmission mechanism having a driving member, a driven member, an epicyclic reduction gear connected to the driving and driven members and provided with a rotatable annulus which can be held against rotation for enabling motion to be transmitted from said driving member to said driven member through said gear, and a retaining pawl for releasably engaging the outer periphery of said annulus to prevent rotation thereof, at least one spring-loaded ball acting on the outer periphery of said annulus to retard rotary motion thereof upon said pawl being put out of action, the outer periphery of said annulus being notched.

TERENCE WILLIAM MILLNS.

REFERENCES CITED

The following references are of record in the file of this patent:

UNITED STATES PATENTS

| Number | Name | Date |
| --- | --- | --- |
| 1,863,110 | Salerni | June 14, 1932 |
| 2,259,437 | Dean | Oct. 21, 1941 |
| 2,417,732 | Bland | Mar. 18, 1947 |
| 2,427,168 | Thompson | Sept. 9, 1947 |
| 2,444,448 | Kanneberg | July 6, 1948 |
| 2,464,494 | Ferreira | Mar. 15, 1949 |

FOREIGN PATENTS

| Number | Country | Date |
| --- | --- | --- |
| 45,188 | Denmark | Feb. 1, 1932 |